April 1, 1941. C. F. MEINZER 2,236,691
METHOD AND APPARATUS FOR FORMING GRANULATED SLAG MASSES
Filed Jan. 30, 1939 4 Sheets-Sheet 1
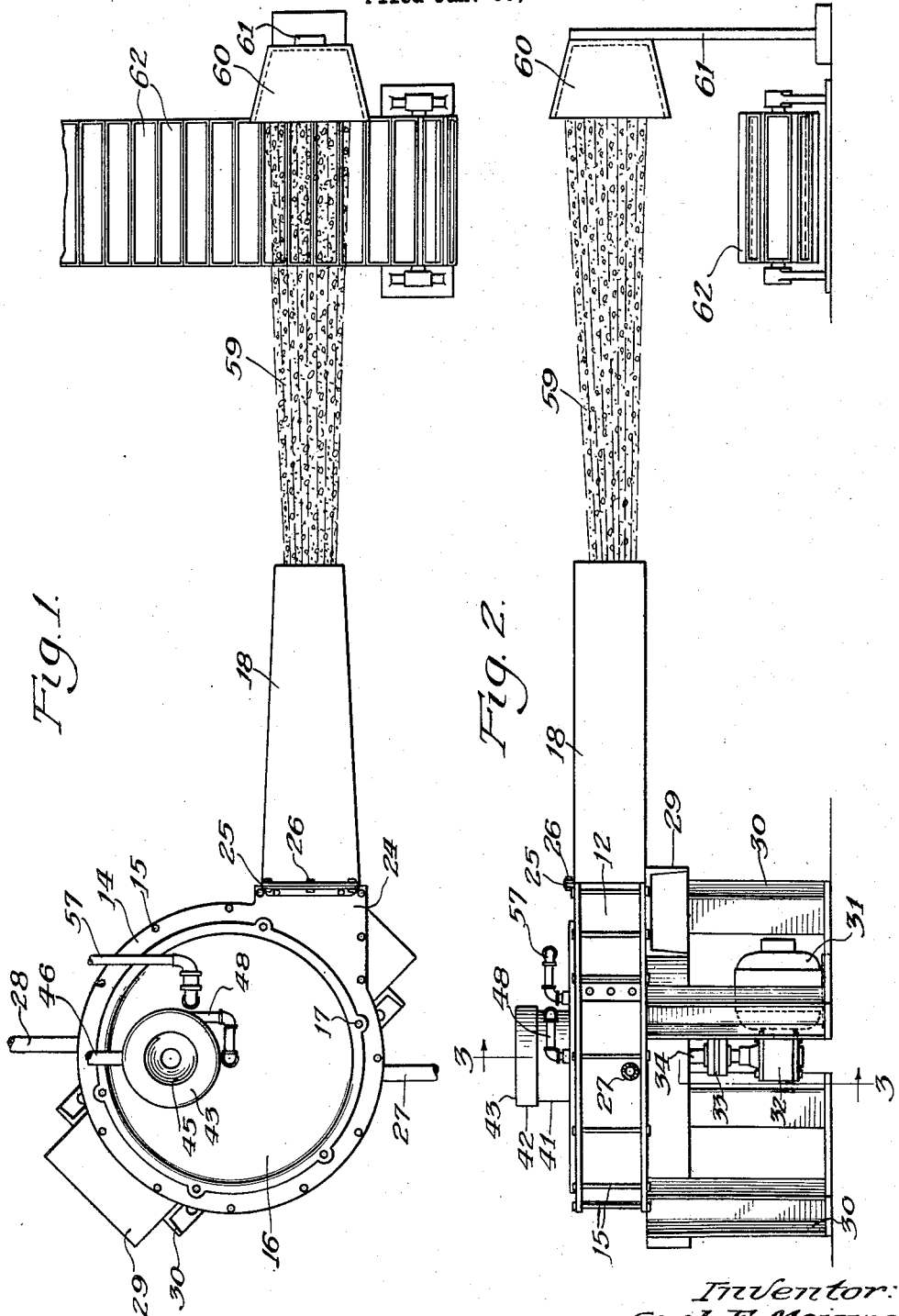
Inventor:
Carl F. Meinzer,
By: Lee J. Gary
Attorney April 1, 1941. C. F. MEINZER 2,236,691
METHOD AND APPARATUS FOR FORMING GRANULATED SLAG MASSES
Filed Jan. 30, 1939 4 Sheets-Sheet 2

Inventor:
Carl F. Meinzer
By Lee J. Gary
Attorney

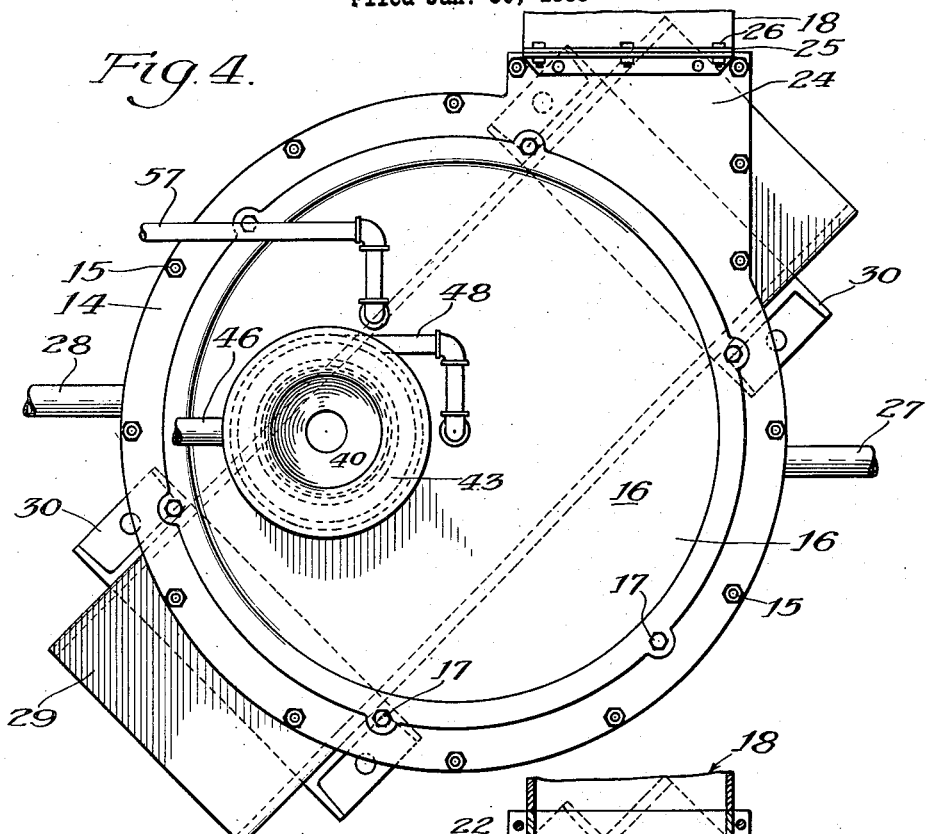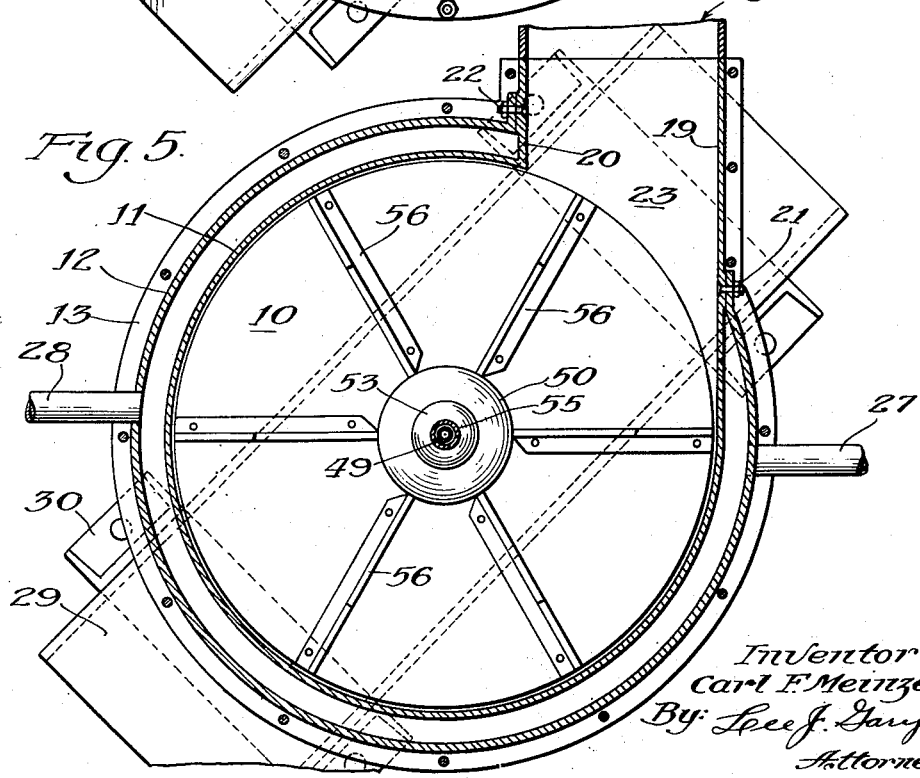

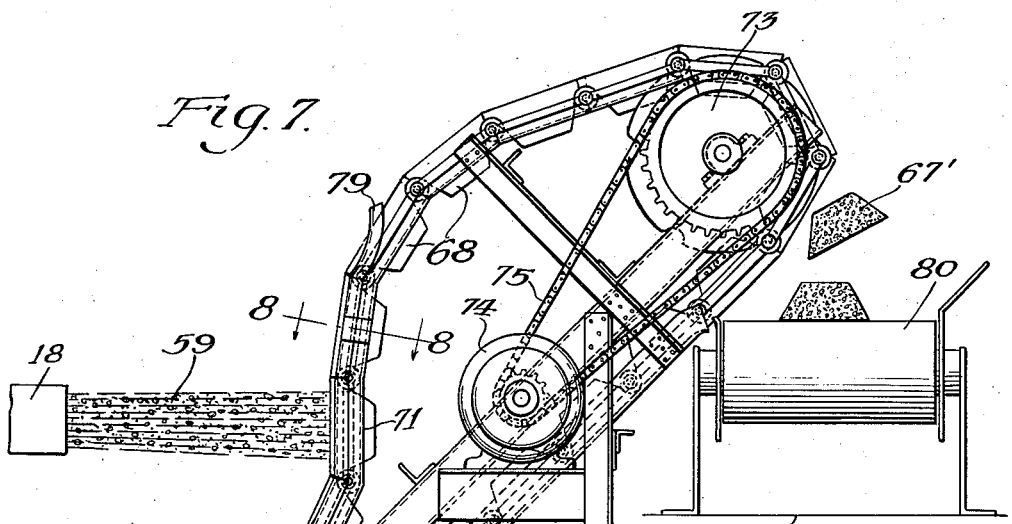
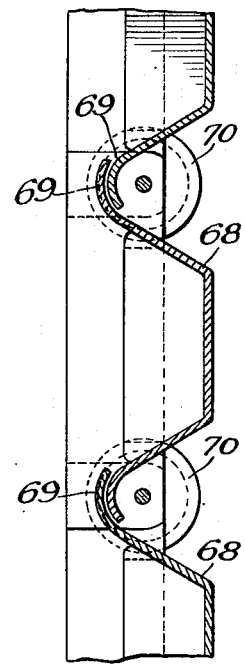
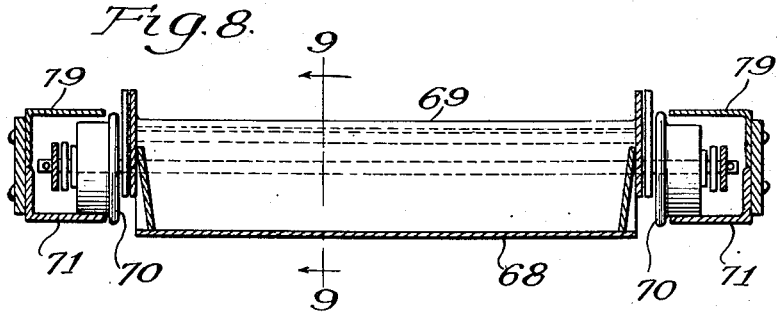

Patented Apr. 1, 1941

2,236,691

UNITED STATES PATENT OFFICE 2,236,691

METHOD AND APPARATUS FOR FORMING GRANULATED SLAG MASSES

Carl F. Meinzer, Chicago, Ill., assignor to Wallace L. Caldwell, Birmingham, Ala.

Application January 30, 1939, Serial No. 253,507

11 Claims. (Cl. 49—1)

This invention relates to a novel method and apparatus for producing unit masses of light weight cellular material from blast furnace slag, electric furnace slag, or other molten slag-like material, which may be crushed to size suitable for concrete aggregate.

The general method of adding water to molten slag to form granulated slag is well known. Specific methods have also been employed to incorporate water and/or steam with liquid slag in order to disintegrate the slag and produce cellular particles. However, such methods have resulted in the formation of particles of fine sizes largely unsuited for use as concrete aggregate and of weak structure. Attempts have also been made to form cellular masses of slag by adding cool or heated water to controlled masses of molten slag and thus puffing the mass. Such methods not only result in poor cellular structures but also form bodies of weak structure.

It is an object of this invention to treat molten slag, such as blast furnace slag or the like in a manner whereby light weight cellular masses suitable for use as concrete aggregate are formed, and which are tough and free from lines of incipient fracture.

Another object is to granulate liquid slag in the form of finely divided cellular particles and to thereafter bring the granulated particles together and weld them into hard and tough masses.

A further object relates to the means for rapidly and continuously granulating liquid slag and to the means whereby the granulated particles while still retaining an annealing heat are welded together to form masses of firm and even cellular texture.

In general, my invention relates to the incorporation of water in limited and controlled quantities to molten slag, and by aid of water pressure, disintegrating apparatus, and centrifugal force the slag is uniformly mixed with the water and torn apart to form finely divided cellular particles. These cellular particles while in finely divided condition and still retaining heat are ejected at a high velocity against a surface interposed in their path and collected and built up under the resultant pressure and by means of their retained heat into welded unitary cellular masses on the order of from one-quarter cubic foot to one cubic foot, and then allowed to anneal and cool. The whole process is continuous and the masses are withdrawn as formed, to storage, or to crushing machinery to be reduced to suitable sized particles of strong but light weight cellular formation, free from lines of incipient cleavage.

Referring to the drawings:

Fig. 1 is a plan view of apparatus for carrying out my process, and illustrates my liquid slag granulating device and one form of a particle agglomerating unit, and, Fig. 2 is an elevation thereof.

Fig. 4 is an enlarged fragmentary plan view of the slag granulating portion of my apparatus shown in Fig. 1.

Fig. 5 is a section on the line 5—5 of Fig. 3.

Fig. 7 is an elevation of another modified form of an agglomerating unit.

Fig. 8 is a section on the line 8—8 of Fig. 7, and,

Fig. 9 is a fragmentary section of a portion of the unit shown in Fig. 7, taken on the line 9—9 of Fig. 8.

Figure 3:
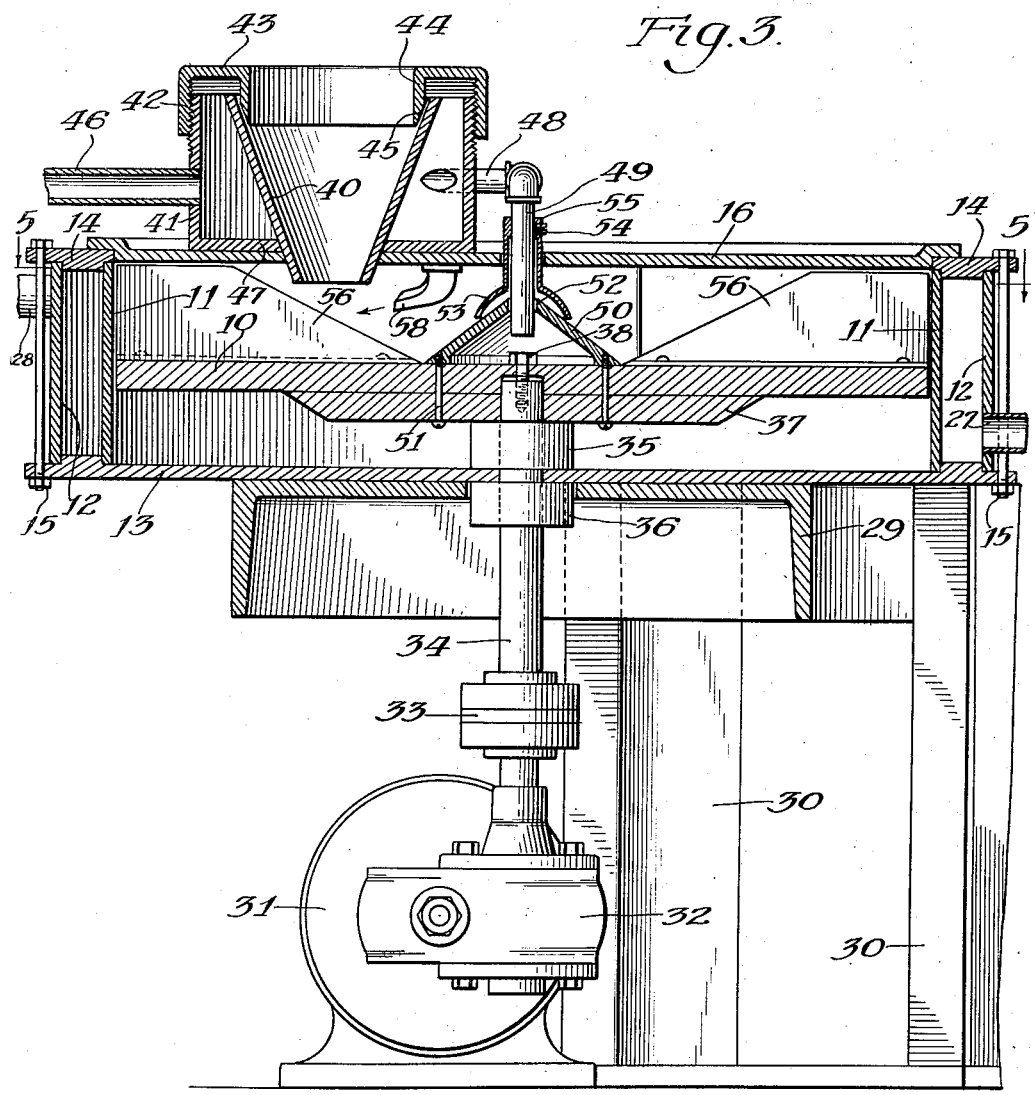
Fig. 3 is a vertical section on the line 3—3 of Fig. 2.

Referring to the drawings, in general, the preferred form of the liquid slag granulating portion of my apparatus comprises the turntable or rotatable disc 10 the major portion of which is surrounded by the wall 11, which in turn is surrounded by the water jacket 12. Below the turntable 10, and spaced therefrom so as to provide an additional water jacket if desired, is the bottom closure plate 13 of sufficient diameter to form a bottom closure for the water jacket 12. The top of the annular water jacket is closed by the substantially annular portion 14, which is secured as by bolting, at spaced apart points 15, to the bottom plate 13. A circular cover plate 16 extends above the turntable 10 and is bolted to the portion 14 at spaced apart points as at 17 for ease in removal when necessary or desired.

Extending outwardly from the turntable 10 is a tangential discharge path defined laterally by the sides 19 and 20, side 19 of which extends substantially tangentially from the periphery of the turntable 10 in the direction of its rotation, and merges with the enclosure wall 11. The opposed side 20 of the discharge path is substantially parallel to the side 19, and joins the opposed end of the wall 11. Likewise the terminal ends of the water jacket 12 extend to the discharge path sides 19 and 20 and are bolted thereto at 21 and 22 respectively. A bottom closure member 23 extends between the sides 19 and 20 and is built up to a level with the turntable 10, and the top of the discharge path is closed by the projection 24 from the annular member 14, or although not shown, may comprise a separate hood-like piece. To this discharge path formed by the walls 19, 20 and the top and bottom portions 23 and 24 is secured the discharge tube extension 18, by suitable flanges 25 and bolts 26, the sides of the said tube extension 18 converging somewhat to the outer end thereof. For the purpose of cooling the slag granulating apparatus and controlling the heat of the slag being processed therein as will be hereinafter more fully set forth, water may be circulated in the space formed between the wall 11 and the jacket 12 by means of the water inlet 27 and outlet 28, and likewise, although not shown, water may be circulated in the space between the base 13 and the turntable 10.

The base 13 of the aforesaid apparatus is supported by means of the bed 29 mounted on suitable standards such as 30, between which is positioned a drive means, such as the motor 31, and its speed reducer 32. Connected to the speed reducer through the flexible coupling 33 is the axial drive shaft 34 which extends through the bed 29 and the bottom plate 13, whereat it is journaled in the main bearing 35 and pilot bearing 36 and engaged through the bearing plate 37 to the turntable 10 by suitable means, as at 38.

Positioned on the cover plate 16 and extending through it at a point to one side of its axis, is the funnel 40 for admitting liquid slag to the turntable. This funnel is suitably provided with a cylindrical casing 41 spaced therefrom, and to the upper edge of which is threadably engaged the outer flange 42 of the annular recessed collar 43. The inner flange 44 of the collar extends inwardly of the funnel 40, and is provided with an inwardly beveled edge 45 cooperating with the taper of the funnel, and forms a variable jet which may be varied by rotation of the threaded engagement of the outer flange 42. The casing 41 is provided with a water inlet 46 whereby water may be admitted to the chamber formed by the collar 43, the funnel 40, the casing 41 and its base 47. Water admitted to this chamber may be first utilized to cool the funnel 40 and thereafter admitted into the funnel by means of the jet 45, if desired, it being understood that the jet may be turned down so as to prevent passage of water.

Water admitted through inlet 46, in excess of the amount drawn off by the jet 45, passes outwardly from the aforesaid chamber through the outlet 48 and downwardly through the tube 49 which extends axially through the cover plate 16, and terminates inwardly of the hollow cone 50. The base of the cone rests on the turntable 10 to which it is suitably secured, as by the bolts 51, and axially thereof. The apex 52 of the hollow cone 50 is truncated to an extent whereby clearance is given to tube 49 to permit water admitted to flow outwardly of the cone. To regulate the degree of this outward flow from the cone, a variable cone overflow jet 53 is provided which can be raised or lowered to seat against the cone surface by means of the knurled flange 54 on the outwardly extending sleeve 55.

The turntable 10 is provided with a plurality of radial vanes 56 spaced at equal angles to each other. These vanes, preferably as shown, extend from the periphery of the turntable and for a distance inward to substantially the height of the cover plate 16, after which they taper downwardly to the base of cone 50. An additional water inlet 57 is provided for admitting water under pressure to the interior of the granulating apparatus and the contents thereof by means of the directional jet 58. This jet is positioned adjacent the funnel 56 and extends from the cover 16 downwardly and laterally away from the table axis.

In the operation of the hereinbefore described slag granulating portion of my apparatus, cooling water is circulated around the wall 11, and if desired under the turntable 10. Water is admitted from inlet 46 to cool the exterior of funnel 40 and the interior of cone 50, and their respective jets 45 and 53 adjusted to permit overflow, preferably under pressure, to both flush the exposed surfaces of the funnel and cone, and to introduce water to the molten slag at these points in limited quantities to aid in the slag disintegration. The liquid slag, which may be molten blast furnace slag is introduced through funnel 40 where it is commingled with water from jet 45 and drops to turntable 10 which is rotated at a high speed, on the order of 550 revolutions per minute. Here additional water is added by means of jet 53, and the jet 58 under high pressure to tear the slag apart by the aid of the vanes 56, while at the same time the centrifugal force imparted to the materials on the turntable causes them to be impelled against the wall 11 where the resultant centrifugal pressure forms an intimate uniform mixture of the water and slag to finely divide or granulate the slag, and thereafter the slag is expelled outwardly from the turntable through the tangential path therefrom at a high velocity by means of force resulting from the centrifugal force imparted by the turntable and the impelling action of the vanes. The water admitted to the slag by means of the jets 45, 53 and 58 while sufficient to aid in the disintegrating process, is limited so that the cellular granulated slag particles as they leave the granulating apparatus are substantially dry and in addition still retain an amount of heat to permit agglomerating of the particles together under pressure.

As the particles of granulated cellular slag impelled from the apparatus in the condition above set forth are too fine to be used for such purposes, as for example coarse concrete aggregate, they are thereafter caused to impinge against collecting means, which will be hereinafter described, interposed adjacent to the exterior of the end of the tube 18 and in the path of the issuing particles, whereby, due to their residual heat, they are agglomerated and fused together into a mass and thereafter allowed to anneal and cool.

In the drawings are shown several forms or modifications of back-stop means or devices for building up the newly formed granulated slag particles into larger masses. Thus Figs. 1 and 2 show one form which comprises a bucket 60 mounted vertically by means of the standard 61 so that its base is at right angles to path of the stream of granulated particles 59 issuing from tube 18, and its mouth is open thereto. As the particles 59 are captured by the bucket 60, they continue to build themselves up into a mass substantially of the size of the bucket due to their velocity and residual heat, and since the backstop device is positioned in the open atmosphere, the mass rapidly cools as it is being formed. At a time when the bucket 60 is substantially filled, the major portion therein has sufficiently cooled to readily part from the bucket, where aided by its accumulated mass and outward flare of the bucket walls, the mass drops onto the moving conveyor belt 62, so that the operation of the entire apparatus may be continuous.

Figure 6:
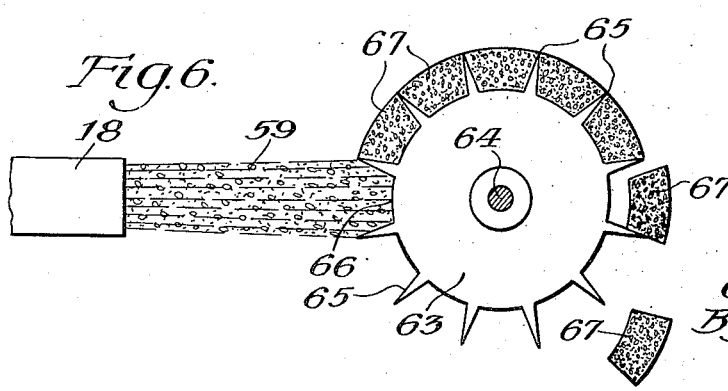
Fig. 6 is a diagrammatic detail illustrating a modified form of an agglomerating unit.

Another form of backstop is shown diagrammatically in Fig. 6. This comprises a revoluble element, such as the drum 63, the axis 64 of which is at right angles to, and intersects the longitudinal axis of tube 18. The drum is provided with a plurality of radial vanes 65 extending from its surface 66, and which it will be understood are endwise closed. The drum 63 is revolved about its axis 64 continuously at a rate consistent with the depth of its vanes 65 and the volume of the issuing particles 59. The particles 59 as they issue from tube 18 impinge against a portion of surface 66 substantially at a right angle to their direction of travel and by the relatively slow movement of drum 63, are permitted to build up between vanes 65 into masses 67. As the drum continues its rotation, the masses 67 cool, and due to their weight drop from between the vanes by gravity, where they may be collected by a conveyor as shown in Fig. 1.

Figs. 7, 8 and 9 illustrate still another form of back-stop apparatus, and is particularly adapted for operations wherein the slag granulating portion of the apparatus is mounted within a pit. In this form, the granulated slag accumulating apparatus comprises a plurality of buckets 68 linked together endwise as at 69 to form an endless chain provided with flanged wheels 70 which ride on rails 71 around the pulleys 72 and 73, the latter being the driving pulley actuated by the motor 74 and chain drive 75. The linked bucket assembly is mounted on a supporting structure, generally indicated as 76, the base 77 of which is adapted to rest on the pit bottom on a level with the base of the granulating apparatus substructure. The endless linked bucket chain is supported in a generally oblique direction with the pulley 72 inside of the pit adjacent to the granulating apparatus and with its axis at right angles to the longitudinal axis of the tube 18. The pulley 73 is positioned angularly away from the granulating apparatus and exteriorly of the pit. In the arrangement shown in Fig. 7, the tube 18 extends at approximately the ground level 78, and as the particles 59 are expelled therefrom they impinge against buckets 68 traveling at a relatively slow rate through the path of the granulated particles. In order to more evenly accumulate agglomerated masses of particles in the buckets 68 and to permit them to gradually cool at a more even rate, I prefer to cause the buckets, as they intercept the stream of particles 59, to have their mouths open in a plane at a right angle to the issuing stream of particles. This is accomplished by shaping the contour of the upward ride portion of track 71 so that at about its mid-section it rises substantially vertically and causes the buckets passing over that vertical portion to be extended sidewise. In order to aid retention of the buckets and their wheels 70 in this vertically traveling position, the rail 70 is complemented by the hold down rails 79.

As the particle masses are accumulated in the buckets 68 they are conveyed upwardly and exteriorly of the pit, and as the buckets pass around pulley 73, the masses 67' are in a cooled condition and drop from the buckets onto a suitable apron conveyor 80. These masses may thereafter be crushed and screened to size suitable for light weight concrete aggregate.

It will thus be seen that by bringing about an agglomeration of the finely divided cellular slag particles while still in a heated condition so as to weld them together and permitting them to gradually cool, masses of hard and tough material are obtained which have a uniform fine cell structure. The so formed masses, when later crushed for use as concrete aggregate result in aggregate of very high quality the particles of which remain free of incipient lines of cleavage or fracture.

I claim as my invention:

1. The method of producing masses of light weight cellular slag, which comprises, forming from molten slag pellets of cellular slag containing sufficient heat to cause said pellets to weld together when impacted against each other, projecting said pellets against a retaining surface within a receptacle while still containing said heat with sufficient velocity to build up and agglomerate in said receptacle said pellets into enlarged unitary cellular masses, and gradually cooling said unitary masses to produce cooled unitary masses of tough light weight cellular slag.

2. The method of producing masses of light weight cellular slag, which comprises, introducing limited quantities of water into molten slag and disintegrating the same to form pellets of cellular slag containing sufficient heat to cause said pellets to weld together when impacted against each other, projecting said pellets against a retaining surface within a receptacle while still containing said heat with sufficient velocity to build up and agglomerate in said receptacle said pellets into enlarged unitary cellular masses, and gradually cooling said unitary masses to produce cooled unitary masses of tough light weight cellular slag.

3. The method of producing masses of light weight cellular slag, which comprises, centrifugally disintegrating molten slag in the presence of water into pellets of cellular slag containing sufficient heat to cause said pellets to weld together when impacted against each other, projecting a stream of said pellets against a retaining surface within a receptacle while still containing said heat with sufficient velocity to build up and agglomerate in said receptacle said pellets into enlarged unitary cellular masses, and gradually cooling said unitary masses to produce cooled unitary masses of tough light weight cellular slag.

4. The method of producing masses of light weight cellular slag which comprises, introducing limited quantities of water into molten slag and disintegrating the same to form substantially dry pellets containing sufficient heat to cause said pellets to weld together when impacted against each other, projecting said pellets against a retaining surface within a receptacle while still containing said heat with sufficient velocity to build up and agglomerate in said receptacle said pellets into enlarged unitary cellular masses, and gradually cooling said unitary masses to produce cooled unitary masses of tough light weight cellular slag.

5. The method of producing masses of light weight cellular slag, which comprises, delivering a stream of water into contact with a stream of molten slag and depositing the resultant stream on a centrifugal disintegrator and impeller, said stream being in proper proportions to form pellets of cellular slag containing sufficient heat to cause said pellets to weld together when impacted against each other, impelling a stream of said pellets from said disintegrator and impeller against a retaining surface within a receptacle while still retaining said heat with sufficient velocity to build up and agglomerate in said receptacle said pellets into enlarged unitary masses to produce cooled unitary masses of tough light weight cellular slag.

6. The method of producing light weight cellular aggregate from molten slag, which comprises, forming from molten slag pellets of cellular slag containing sufficient heat to cause said pellets to weld together when impacted against each other, projecting said pellets against a retaining surface within a receptacle while still containing said heat with sufficient velocity to build up and agglomerate in said receptacle said pellets into enlarged unitary cellular masses, gradually cooling said unitary masses to produce cooled unitary masses of tough light weight cellular slag and thereafter crushing said masses to form said light weight cellular slag.

7. Apparatus for producing agglomerated masses of cellular slag having a relatively uniform and fine cell structure from molten slag, which comprises, a rotary disintegrating and pellet forming device for forming said molten slag into pellets of cellular slag and for thereafter outwardly impelling said pellets in a stream at a high velocity while containing sufficient heat to weld them together on impact with each other, and pellet accumulation means comprising an open receptacle opening into the pellet stream and positioned sufficiently close to said disintegrating device to arrest the flight of the pellets while they still contain sufficient heat to cause them to cumulatively build up and agglomerate in the form of an enlarged unitary cellular body in said receptacle.

8. Apparatus for producing agglomerated masses of cellular slag having a relatively uniform and fine cell structure from molten slag, which comprises, a rotary disintegrating and pellet forming device for forming said molten slag into pellets of cellular slag comprising means for impinging a regulated and limited amount of water against an introduced stream of slag to reduce the coherency thereof and means for thereafter further disintegrating said slag into pellets of cellular slag and for outwardly impelling said pellets in a stream at a high velocity while containing sufficient heat to weld them together on impact with each other, and pellet accumulation means comprising an open receptacle opening into the pellet stream and positioned sufficiently close to said distintegrating device to arrest the flight of the pellets while they still contain sufficient heat to cause them to cumulatively build up and agglomerate in the form of an enlarged unitary cellular body in said receptacle.

9. Apparatus for producing agglomerated masses of cellular slag of relatively uniform and fine cell structure from molten slag, which comprises, a rotary disintegrating and pellet forming device including a disintegrating chamber having molten slag inlet means, means for impinging water in regulated and limited amount against an introduced stream of molten slag to reduce it to a non-coherent stream adjacent said inlet, and centrifugal means including a rotor for further disintegrating and outwardly impelling said slag in the form of pellets through a peripheral conduit from said chamber at a relatively high velocity in the form of a substantially confined stream while containing sufficient heat to weld them together on impact with each other, and pellet accumulation means comprising an open vessel with its opening towards the mouth of said conduit and positioned sufficiently close to said disintegrating device to arrest the flight of the pellets while they still contain sufficient heat to cause them to cumulatively build up and agglomerate in the form of an enlarged unitary cellular body in said receptacle, whereby gradual cooling of said unitary body produces a cooled mass of tough light weight cellular slag.

10. Apparatus for producing agglomerated masses of cellular slag having a relative uniform fine cell structure from molten slag, which comprises, a rotary disintegrating and pellet forming device including a disc having radial vanes thereon, a peripheral wall surrounding said disc and closely fitting the periphery of said disc, means for rotating said disc, means for delivering a stream of molten slag to the surface of said disc, means for delivering a stream of water into contact with said slag in an amount sufficient to assist in the formation of cellular pellets but insufficient to cool said pellets below a temperature at which said pellets will weld together, said wall having an opening therein, a conduit extending from said opening tangentially from said disc, whereby said disc forms and discharges a stream of said cellular pellets outwardly at high velocity through said opening and said conduit, and pellet accumulation means comprising an open receptacle opening into the pellet stream and positioned sufficiently close to said disintegrating device to arrest the flight of the pellets while they still contain sufficient heat to cause them to cumulatively build up and agglomerate in the form of an enlarged unitary cellular body in said receptacle.

11. Apparatus for producing agglomerated masses of cellular slag having a relatively uniform and fine cell structure from molten slag, which comprises, a rotary disintegrating and pellet forming device including a disc having radial vanes thereon, a peripheral wall surrounding said disc and closely fitting the periphery of said disc, means for rotating said disc, means for delivering a stream of molten slag to the surface of said disc, jet means for delivering a stream of water under pressure into contact with said slag in its path to said disc in an amount sufficient to aid in the formation of pellets but insufficient to cool said pellets below a temperature at which said pellets will weld together, said wall having an opening therein, a conduit extending from said opening tangentially from said disc, whereby said disc forms and discharges a stream of said cellular pellets outwardly at high velocity through said opening and said conduit, pellet accumulating means comprising a plurality of open receptacles and means for moving said containers successively past said end of said conduit with the openings of said receptacles directed toward said end of said conduit, said receptacles being positioned sufficiently close to said disintegrating device to arrest the flight of the pellets while they still contain sufficient heat to cause them to cumulatively build up and agglomerate in the form of enlarged unitary cellular bodies in said receptacles, whereby gradual cooling of said unitary bodies produces cooled unitary bodies of tough light weight cellular slag.

CARL F. MEINZER.